May 25, 1965  L. L. SHORE  3,185,462
APPARATUS FOR MIXING DENTAL AMALGAM AND SEPARATING
EXCESS MERCURY THEREFROM
Filed April 22, 1960  2 Sheets-Sheet 1

INVENTOR.
Louis L. Shore
BY Robb & Robb
Attorneys

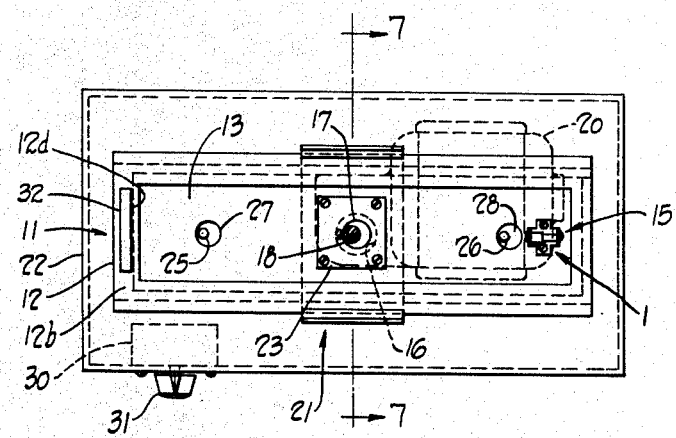
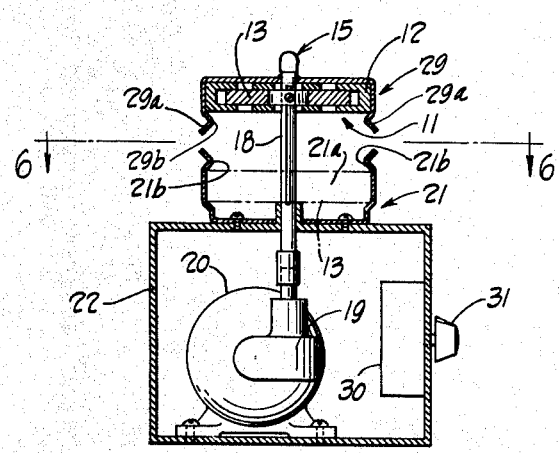

United States Patent Office 3,185,462
Patented May 25, 1965

3,185,462
APPARATUS FOR MIXING DENTAL AMALGAM AND SEPARATING EXCESS MERCURY THEREFROM
Louis L. Shore, 2619 Warrensville Center Road, Cleveland Heights 8, Ohio
Filed Apr. 22, 1960, Ser. No. 23,978
7 Claims. (Cl. 266—1)

This invention relates to apparatus and method of mixing dental amalgam and separating excess mercury therefrom.

For purposes of silver dental fillings, silver and mercury is customarily mixed together to provide a pliable dental filling material which can be manipulated and shaped in the desired manner by the dentist and which will subsequently harden or set after being so manipulated. The mixing of the mercury and silver for the above purpose may be done by hand by means of a mortar and pestle or it may be accomplished by mechanical means as by the use of customary types of dental amalgamators wherein a capsule-like mortar containing a loose pestle is utilized, such capsule being attached to a device to which is imparted a reciprocatory or oscillatory motion for shaking the capsule and thus mixing the contents thereof.

When mixing of the dental amalgam is completed, it is necessary to separate and recover excess mercury from the amalgam mix and this may be accomplished by mechanical means whereby the excess mercury is strained from the amalgam mix by centrifugal action as in a centrifuge.

It is a principal object of the present invention to provide a simple and inexpensive, yet highly efficient method and means for accomplishing both the mixing of the dental amalgam and the separation of excess mercury therefrom by a single apparatus, thus eliminating the necessity for separate mixing and centrifuging devices.

A further object of the invention is to provide such a method and apparatus wherein a capsule-like mortar is utilized and provided with strainer means therein, said capsule-like mortar being attached to a carrier associated with means for selectively imparting mixing action and mercury separating action thereto.

Another object of the invention is to provide such a method and apparatus wherein the mixing action is automatically timed for a selectively predetermined period and the mercury separating action is likewise automatically timed for a selectively predetermined period.

Other objects, advantages and features of the invention will become apparent from the following detailed description taken in conjunction with the accompanying drawings:

FIGURE 6 is a top plan view taken on the line 6—6 of FIGURE 5.

FIGURE 7 is a sectional view of the apparatus, taken on the line 7—7 of FIGURE 6 showing the capsule carrier in full lines in the upper position in condition for mercury separating action, the carrier also being shown in dotted lines in its lower position as in the condition of FIGURE 5 for mixing action.

Figure 1:
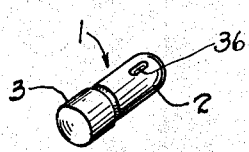
FIGURE 1 is a perspective view of a capsule-like mortar having a strainer enclosed therein and suitable for use in accordance with my invention.
Figure 2:
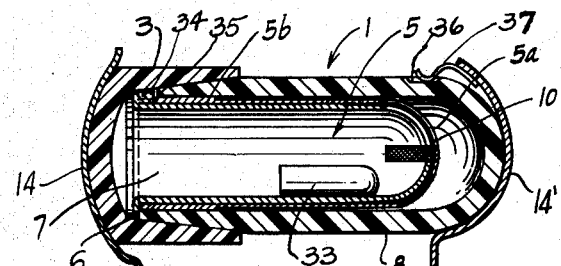
FIGURE 2 is a central longitudinal sectional view through the container and strainer on a considerably enlarged scale.
Figure 3:
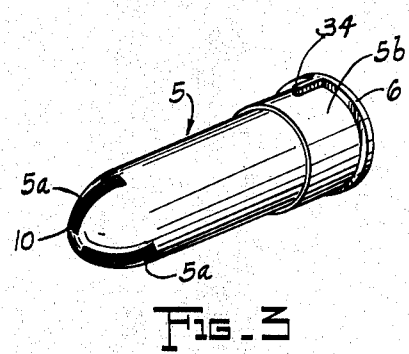
FIGURE 3 is a perspective view of the said container or capsule.
Figure 4:
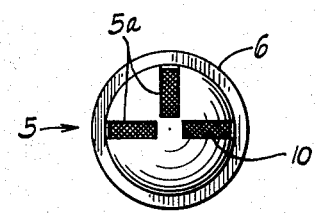
FIGURE 4 is an end view of the strainer.

For purposes of illustration of the manner of carrying out my invention, I may employ a capsule-like container embodying mercury strainer means such as disclosed in my U.S. Patent No. 2,647,638 issued August 4, 1953, or a similar one such as shown in FIGURES 1 through 4 hereof as exemplary of one type of such container which may be employed to contain a dental amalgam to be processed in accordance with the method and by the use of the apparatus of the present invention.

Now referring to the drawings in describing the invention in detail, the numeral 1 designates the capsule-like mortar or container as a whole, the same consisting of a cup-like receptacle 2 and a closure or cap 3.

The receptacle 2 and the cap 3 are generally cylindrical with rounded or semi-spherical end walls and, in the present instance, the exterior surface of the peripheral wall of the receptacle, adjacent the open end of the latter is gradually tapered or, in other words, made frusto-conical for frictional engagement with the reversely tapered inner surface of the peripheral wall of the cap 3.

Within the receptacle 2 there is implaced a relatively deep cup-like strainer 5 which in the present instance is cylindrical throughout the greater portion of its length and has a rounded bottom or end wall provided with slots 5a that radiate from near the axis of the strainer. A flange 6 surrounds the open end of the strainer and its outer surface is shaped to fit the surrounding tapered innersurface of the cap 3. Consequently when the cap is frictionally engaged with the tapered end of the receptacle 2, it will hold the flange 6 snugly against the end of the peripheral wall of the receptacle. Preferably, the strainer is composed of two nested shells. Pressed over the innershell 7 is an outer shell 8, the beforementioned slots 5a extending through both shells; and between the rounded bottom or end walls of the two shells is firmly clamped a foraminous element 10. This may consist of a piece of chamois or, preferably, a piece of fine mesh linen gauze, such as that known in the dental profession as "squeeze" cloth, and the porosity of which is so fine that mercury will pass therethrough only under artificial force applied thereto and silver and mercury amalgam will not pass therethrough.

The receptacle 2 and cap 3 may be made of plastic as indicated. The inner and outer shells of the strainer 5 may be made of metal, although plastic may be employed for this element of the combination as well.

Figure 5:
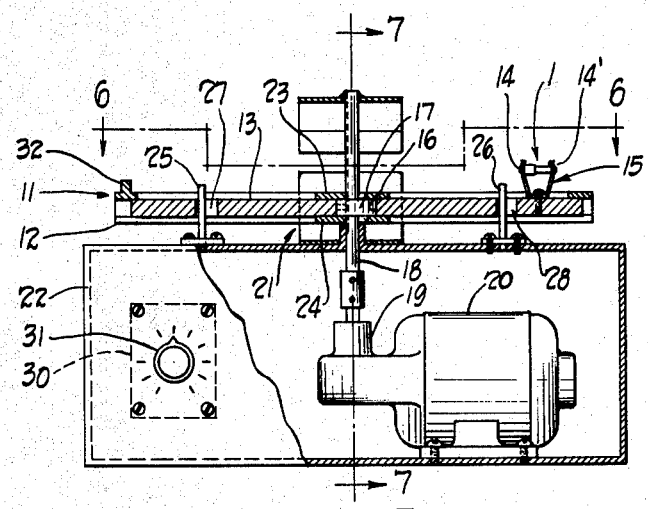
FIGURE 5 is a vertical sectional view of the apparatus for imparting mixing and mercury separating action to the capsule-like container or mortar.

Now referring to FIGURES 5 to 7 inclusive there is shown apparatus for imparting mixing action and mercury separating action with respect to dental amalgam contained in a container such as the container 1. Such apparatus may include a carrier generally indicated by the numeral 11 and comprising a frame 12 within which is slidably carried a slide plate 13 near one end of which there is provided container holder means generally indicated by the numeral 15 and which may comprise the resilient fingers 14, 14' slidably secured to the plate 13. The resilient fingers 14, 14' can be made of light metal of plastic or any other suitable material. The frame 12 can be suitably formed of sheet metal or other material to provide vertical side portions 12a, a horizontal top portion 12b and horizontally extending bottom portions 12c, the frame 12 thus extending around the sides, top and bottom of the slide plate 13. The top portion 12b of the frame may have its central area cut away as at 12d so that the top portion 12b constitutes an upper ledge or rim overlying the slide plate 13.

The slide plate 13 is provided with a cam slot or opening therethrough and designated 16 for cooperation with a cam or eccentric member 17 splined to the shaft 18 which is driven through the gearing 19 by the electric motor 20. Rotation of the shaft 18 serves to impart reciprocating movement to the slide plate 13 through the operation of the cam or eccentric member 17 in the cam slot 16. Thus the slide plate 13 is caused to reciprocate relative to the carrier frame 12 when the latter is held stationary to prevent the frame 12 from being rotated during rotation of the shaft 18 and eccentric member 17. The means for holding the carrier frame 12 in such stationary condition may comprise a resilient clip generally designated 21 which may be secured to the housing 22 or other stationary part of the apparatus. The resilient clip or locking means 21 may be formed of resilient metal or other suitable material to provide the spaced sides or finger elements 21a which are adapted to engage the opposite sides 12a of the carrier 12. The side members or fingers 21a of the locking means 21 are provided as shown with inwardly protruding portions 21b which may extend over and engage the upper surface of the frame 12 when the same is positioned in its lowermost position as shown in FIGURE 5 and in the dotted line position of FIGURE 7.

It will be understood in this connection that the entire carrier 11 comprising the carrier frame 12 and slide plate 13 is movable as a unit axially of the shaft 18 by virtue of the splined connection of the eccentric 17 with respect to the shaft 18, the eccentric 17 being retained in position relative to the slide plate 13 by suitable retainer means such as the retainer plates 23 and 24 suitably secured to the slide plate 13.

It will be further understood that when the carrier 11 is moved axially of the shaft 18, from the upper position of the carrier to the lower position indicated, the sides or fingers 21a will yield outwardly as the carrier frame 12 engages the protrusions 21b to permit the carrier to pass by said protrusions so that the latter will snap into engagement with the upper surface of the carrier frame 12 when the latter is in the lowermost position indicated.

If desired, additional or alternative means may be provided for holding the carriage or carrier 11 against rotation during rotation of the shaft 18. Such additional or alternative means may comprise the pins or studs 25 and 26 secured to the housing 22 and extending upwardly therefrom through slots 27 and 28 respectively extending through the slide plate 13. If the pin and slot retaining means 25–28 is employed, the retaining or locking means 21 may be eliminated and likewise, if the means 21 is utilized the retaining means 25–28 may be eliminated although, if desired, both the means 21 and the means 25–28 may be expediently availed of.

When it is desired to impart to the carrier 11 a rotary motion, said carrier will be moved axially of the shaft 18 to its upper position shown by full lines in FIGURE 7 and it will be retained in that position by the locking or retaining means 29 secured to the shaft 18 for rotation therewith. The locking or retaining means 29 may comprise a resilient retainer clip like the retainer clip 21 and having the sides or fingers 29a provided with the inward protrusions 29b, the said fingers being outwardly yieldable upon engagement by the carrier 11 to permit passage of the carrier upwardly past said protrusions which will then snap into place beneath the carrier to retain it in its upper position.

In the practice of my invention, when it is desired to mix the dental amalgam comprising silver and mercury, such amalgam ingredients are placed in the container 1 with or without the strainer 5, and the container 1 is placed in the container holder 15 in the manner previously indicated, the carrier 11 being positioned in its lowermost position as indicated in FIGURE 5 and retained in such position against rotation by the means 21 or the means 25–28, or both. The motor 20 is then started to cause rotation of the shaft 18 which serves to impart reciprocating movement to the slide plate 13 relative to the carrier frame 12 to effect mixing of the amalgam. After a suitable period of such mixing the motor 20 is switched off and the carrier 11 is moved axially of the shaft 18 to its uppermost position indicated by full lines in FIGURE 7 where it is retained in such position by the locking means 29 which, as before mentioned, rotates with the shaft 18. The motor 20 is then again started and operated for a desired length of time. With the carrier 11 in its uppermost position, the rotation of the shaft 18 will effect rotation of the carrier 11 since it is locked to shaft 18 by the locking means 29. Such rotation of the carrier will serve by centrifugal action to cause excess mercury to pass through slots 5a to another part of the container and thus the excess mercury is separated from the remaining amalgam mix.

If the strainer 5 was not in the container 1 during the mixing operation, said strainer 5 would of course be placed in the container 1 and the amalgam mix placed therein inside of the strainer 5 before rotating the carrier 11 in its upper position with the container 1 affixed thereto for the mercury separating action to be accomplished by the centrifuging effect of the rotary movement of the carrier 11.

In the practice of my invention, the silver and mercury to be mixed may be initially placed within the strainer 5 in the container 1 for the mixing operation with the container affixed to the carrier 11 with the latter in its lowermost position for reciprocatory mixing action. If that is done, it will not be necessary to stop, after the mixing action is completed, to replace the strainer in the container 1 with the amalgam mix inside the strainer before proceeding with the rotary centrifuging action to separate the excess mercury from the amalgam mix. Under such condition with the mercury and silver initially in the strainer for the mixing action, it will only be necessary after the mixing action is completed, to move the carrier to the uppermost position and restart the motor for the rotary contrifuging action.

Suitable timer means indicated by the numeral 30, of conventional type, may be provided for controlling operation of the motor 20 for a predetermined period of time of operation dependent upon the setting of a suitable switch 31 for the particular time interval desired to be selected thereby.

It should be noted that the container 1 is affixed to the container holder 15 in such an manner that the cylindrical axis of the container extends radially of the axis of the shaft 18 and with the cap 3 end of the container facing toward the shaft 18, so that the mercury and silver amalgam within the strainer 5 within the container 1 is disposed inwardly toward the axis of rotation of the shaft 18 relative to the slots 5a and the screen 10 which are radially outwardly disposed from said axis of rotation relative to the disposition of the dental amalgam in the container.

A suitable counterweight 32 may be secured to the carrier frame 12 at the end thereof opposite that at which the container 1 is mounted.

While I may employ, for the purposes of the present invention, a capsule-like container such as that disclosed in my aforesaid Patent Number 2,647,638, I preferably employ the somewhat different form of such container as shown in the accompanying drawings, it being noted that the strainer 5 thereof has the slots 5a only in the upper half thereof. This construction will facilitate the operation of mixing the silver and mercury amalgam by the oscillatory motion of the slide plate 13 in view of the fact that the mercury and silver filings contained in the lower half of the strainer 5 will not be projected against the slotted and screened portion of the strainer 5 during such oscillatory mixing operation and hence the mercury will not be expelled from the strainer 5 during such operation.

To facilitate the mixing of the silver and mercury amalgam, it is desirable to place within the strainer 5 a relatively heavy pestle such as indicated at 33 which will serve to agitate the mercury and silver filings during the mixing operation so as to insure adequate coating of the silver filings with mercury.

In order to orient the capsule 1 properly in the holder means 15 so that the strainer will always be disposed with the slotted portions 5a only in the upper portion thereof, the portion 5b of the strainer is provided with a key 34 extending from the flange 6 and designed to enter a corresponding slot 35 in the receptacle 2. Also, for this purpose, a depression 36 is provided in the upper surface of the receptacle 2 for cooperation with the free end of a spring finger 37 attached to or forming a part of the spring finger 14' so that the capsule or container 1 will always be disposed with the strainer 5 in the desired position when the container 1 is emplaced in the holder means 15 with the end of the spring finger 37 engaging in the depression 36.

I claim:

1. Dental apparatus comprising, in combination, a container for dental amalgam, a carrier therefor, means for detachably securing said container to said carrier, said container having a screen therein capable of permitting passage of mercury but not silver and mercury amalgam therethrough, means for selectively imparting oscillatory motion to said carrier at one time and rotary motion to said carrier at another time, and means for automatically timing the periods of said oscillatory and rotary motions for respective pre-determined time intervals.

2. Dental apparatus comprising, in combination, a container for containing dental amalgam, a carrier therefor, said carrier comprising a carrier frame and a slide plate slidably mounted relative thereto, means for detachably securing said container to said slide plate, cam means associated with said slide plate to effect oscillatory movement thereof relative to said carrier frame, power means for operating said cam, means selectively cooperable with the carrier to retain the same stationary for oscillatory motion of the slide plate relative to the carrier, and means for selectively retaining the carrier out of cooperative relation with said retaining means for rotary movement of said carrier and slide plate by said power means.

3. Dental apparatus comprising, in combination, a container for containing dental amalgam, a carrier therefor, a slide plate mounted for sliding movement relative to said carrier, a rotatable shaft, cam means fixed to said shaft for rotation therewith but axially shiftable relative thereto, said slide plate having cam means cooperable with said shaft cam means for effecting oscillatory movement of said slide plate relative to said carrier when the carrier is held against rotation, means for selectively retaining said carrier against rotation, locking means fixed to said shaft and cooperatively engageable with said carrier upon shifting of said carrier axially of said shaft into engagement therewith for rotatively connecting the carrier to said shaft out of engagement with said retaining means.

4. Dental apparatus comprising, in combination, a container for containing dental amalgam, a carrier therefor, said carrier comprising a carrier frame and a slide plate slidably mounted relative thereto, means for detachably securing said container to said slide plate, cam means associated with said slide plate to effect oscillatory movement thereof relative to said carrier frame, power means for operating said cam, means selectively cooperable with the carrier to retain the same stationary for oscillatory motion of the slide plate relative to the carrier, means for selectively retaining the carrier out of cooperative relation with said retaining means for rotary movement of said carrier and said slide plate by said power means, and means for automatically timing the periods of said oscillatory and rotary motions for respective predetermined time intervals.

5. Dental apparatus comprising, in combination, a container for containing dental amalgam, a carrier therefor, a slide plate mounted for sliding movement relative to said carrier, a rotatable shaft, cam means fixed to said shaft for rotation therewith and axially shiftable relative thereto, said slide plate having cam means cooperable with said shaft cam means for effecting oscillatory movement of said slide plate relative to said carrier when the carrier is held against rotation, means for selectively retaining said carrier against rotation, locking means fixed to said shaft and cooperatively engageable wtih said carrier upon shifting of said carrier axially of said shaft into engagement therewith for rotatively connecting the carrier to said shaft out of engagement with said retaining means, power means for rotating said shaft, and means associated with said power means for automatically timing the period of operation of said power means for variable selected time intervals.

6. Dental apparatus comprising, in combination, a container for containing dental amalgam, a carrier therefor, said carrier comprising a carrier frame and a slide plate slidable mounted relative thereto, means for detachably securing said container to said slide plate, cam means associated with said slide plate to effect oscillatory movement thereof relative to said carrier frame, power means for operating said cam, means selectively cooperable with the carrier to retain the same stationary for oscillatory motion of the slide plate relative to the carrier, means for selectively retaining the carrier out of cooperative relation with said retaining means for rotary movement of said carrier and said slide plate by said power means, and means for automatically timing the periods of said oscillatory and rotary motions for respective predetermined time intervals, said container having a screen therein capable of permitting passage of mercury but not silver and mercury amalgam therethrough.

7. Dental apparatus comprising, in combination, a container for containing dental amalgam, a carrier therefor, a slide plate mounted for sliding movement relative to said carrier, a rotatable shaft, cam means fixed to said shaft for rotation therewith and axially shiftable relative thereto, said slide plate having cam means cooperable with said shaft cam means for effecting oscillatory movement of said slide plate relative to said carrier when the carrier is held against rotation, means for selectively retaining said carrier against rotation, locking means fixed to said shaft and cooperatively engageable with said carrier upon shifting of said carrier axially of said shaft into engagement therewith for rotatively connecting the carrier to said shaft out of engagement with said retaining means, power means for rotating said shaft, and means associated with said power means for automatically timing the period of operation of said power means for variable selected time intervals, said container having a screen therein capable of permitting passage of mercury but not silver and mercury amalgam therethrough.

References Cited by the Examiner
UNITED STATES PATENTS

| | | | |
|---|---|---|---|
| 811,097 | 1/06 | Seaman | 266—34 |
| 1,578,067 | 3/26 | Bonoff | 259—72 X |
| 1,669,485 | 5/28 | Nordling et al. | 76—63 |
| 1,706,722 | 3/29 | York | 266—34 |
| 1,989,852 | 2/35 | Eppensteiner | 75—63 |
| 2,665,008 | 1/54 | Call | 22—65.1 |

DAVID L. RECK, *Primary Examiner.*

NATHAN MARMELSTEIN, RAY K. WINDHAM,
*Examiners.*